STACKED MAGNETIC MEMORY SYSTEM

Filed Sept. 4, 1964

INVENTOR.
ANDREW N. SARNO
BY
Morse, Altman & Oates
ATTORNEYS

INVENTOR.
ANDREW N. SARNO
BY
Moss, Altman & Oates
ATTORNEYS

United States Patent Office 3,432,827
Patented Mar. 11, 1969

3,432,827
STACKED MAGNETIC MEMORY SYSTEM

Andrew N. Sarno, Medford, Mass., assignor to DI/AN Controls, Inc., Boston, Mass., a corporation of Massachusetts Filed Sept. 4, 1964, Ser. No. 394,412
U.S. Cl. 340—174 3 Claims
Int. Cl. G11b 5/00

ABSTRACT OF THE DISCLOSURE

A densely packed coincident current core memory system is provided wherein multiple memory planes are arranged in superimposed relation with the matrix in each plane comprising a plurality of magnetic cores arranged in horizontal rows and vertical columns with the axes of all of the cores being generally parallel and coplanar with one another. X and Y drivers operate from one side only of the matrix and the sense winding is passed diagonally back and forth through the cores. The inhibit winding is threaded through the cores in one column or row of core elements in one matrix plane and is carried down to the underlying core matrix where it is threaded back through the cores in a column or row in the underlying matrix. The winding is then looped back up to the first matrix and threaded down through the next column or row of cores until the two core matrices are sewn together by the inhibit winding.

Figure 1:
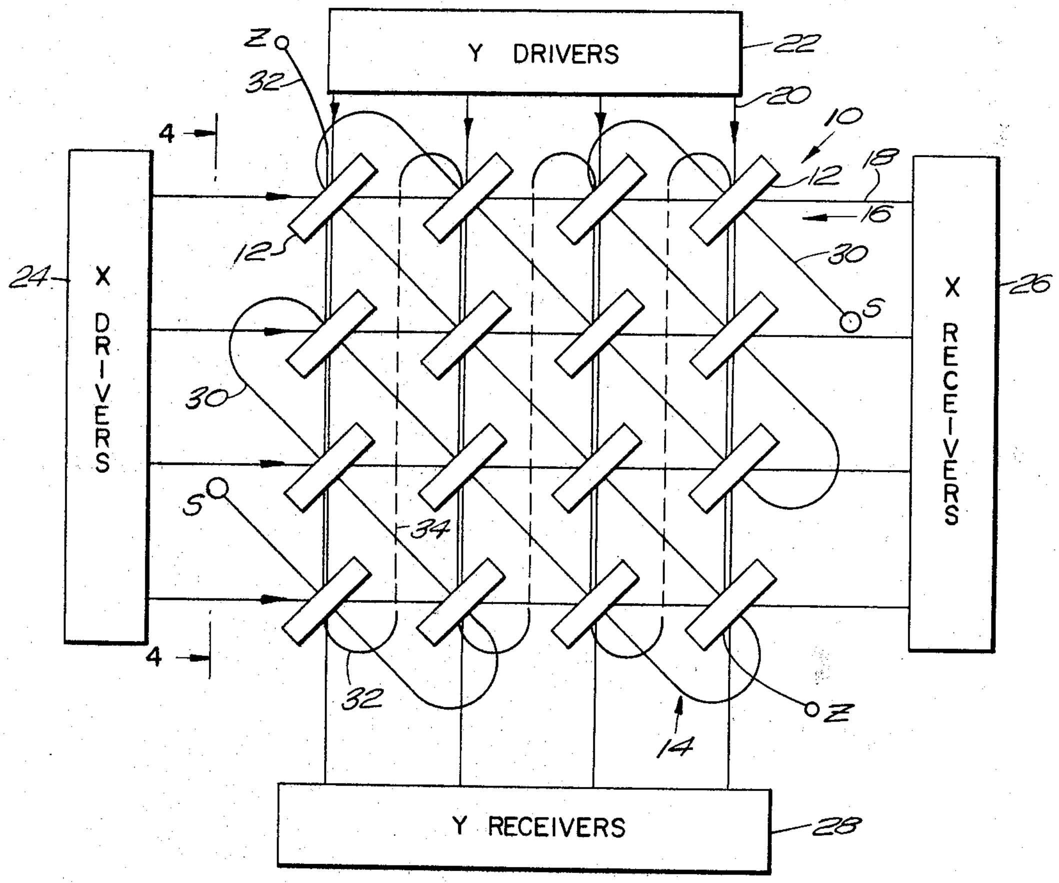

This invention relates generally to magnetic core memory systems and more particularly is directed towards a coincident current magnetic core memory system characterized by a high-density core matrix.

In many applications of digital computers, it is essential that the various components be as compact as possible. This requirement is particularly critical in aero-space applications, for example, where the limitations of available space call for miniaturization in design and rigorous operating efficiency.

Memory systems in existing digital computers occupy a relatively large volume primarily by reason of the core arrangement in the magnetic core memory planes. Heretofore, the cores in a coincident current core memory system have been assembled in horizontal rows and vertical columns with adjacent cores being disposed generally at right angles to one another. This pattern requires an excessive amount of matrix area by reason of the large interstices between the cores. Furthermore, the X and Y drivers heretofore have been arranged to drive in alternate directions from row to row and from column to column necessitating an excessive amount of lead wire. A further disadvantage with existing matrix patterns is that they necessitate complex sense wiring schemes involving long lead lengths. Associated with the complex wiring found in this type of core arrangement is a relatively large number of wiring errors occurring during assembly and necessitating tedious rewiring.

Accordingly, it is an object of the present invention to provide improvements in magnetic core memory systems.

Another object of this invention is to provide an improved core arrangement and wiring system for a coincident current core memory system.

Still another object of this invention is to reduce the size of magnetic core memory systems by increasing the density of the core elements.

A still further object of this invention is to provide a simplified wiring system for a coincident current core memory matrix.

More particularly, this invention features a coincident current core memory system wherein the memory matrix comprises a plurality of magnetic cores arranged in horizontal rows and vertical columns with the axes of all of the cores being arranged generally parallel and coplanar with one another.

As a related feature the X and Y drivers operate from one side and from one end only of the matrix and the sense winding is passed diagonally back and forth through the cores in a very simple fashion requiring relatively short lead lengths.

As another feature of this invention the inhibit winding is threaded through the cores in one column or row of core elements in one matrix plane and then is carried down to a second underlying core matrix where it is threaded back through the cores in a column or row in the underlying matrix. The winding is then looped back up to the first matrix and threaded down through the next column or row of cores until the two core matrices are sewn together by the inhibit winding. This arrangement permits the planes to be folded in half and sewn together thereby utilizing substantially the entire length of the inhibit winding and at the same time reducing the area of the matrix.

Figure 2:
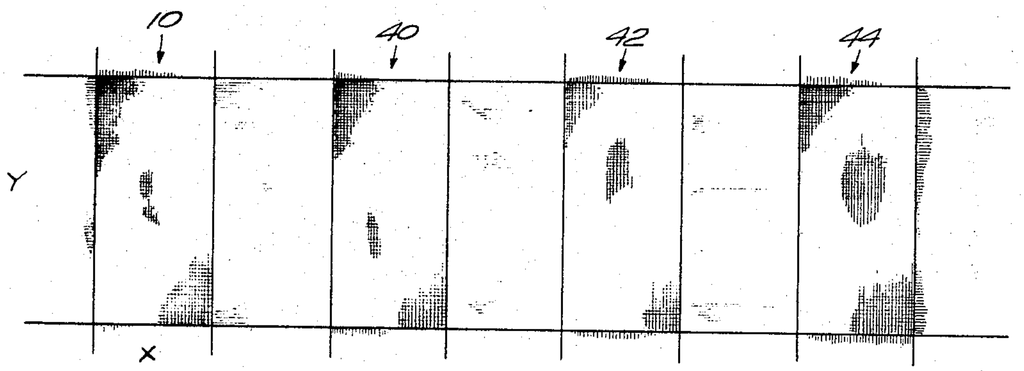
Figure 4:
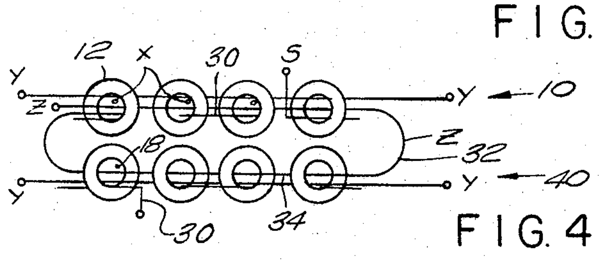
Figure 3:
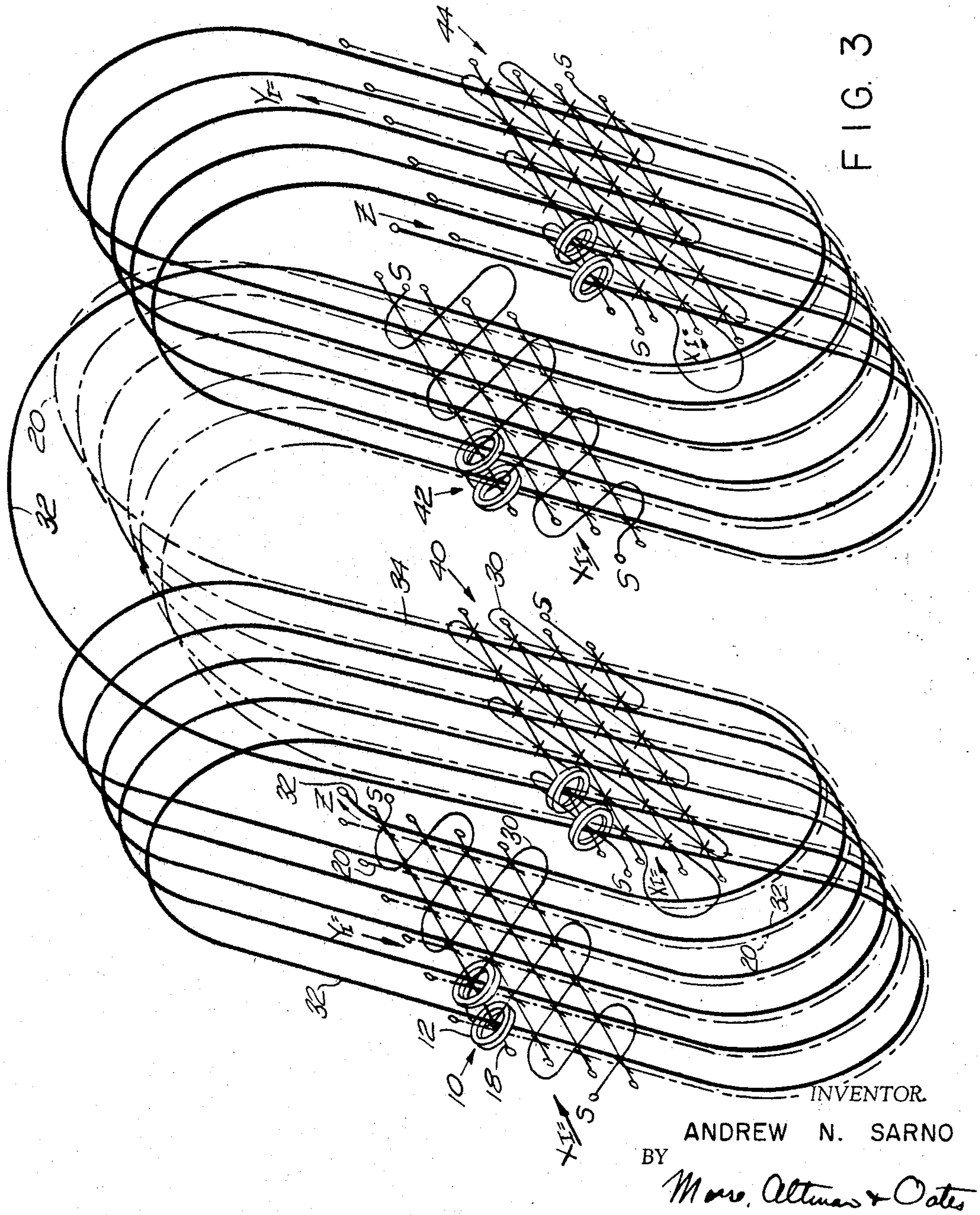

However, these and other features of the invention, along with further objects and advantages thereof will become more fully apparent from the following detailed description of a preferred embodiment of the invention with reference being made to the accompanying drawings in which:

FIG. 1 is a schematic diagram of a coincident current core memory matrix made according to the invention, FIG. 2 is a view in perspective somewhat schematic showing a core plane comprising four matrices, FIG. 3 is an exploded perspective view showing an assembled core memory with the matrices separated to show wiring details, and FIG. 4 is a cross-sectional view taken along the line 4—4 of FIG. 1.

Referring now to the drawings, the reference character 10 generally indicates a matrix of magnetic memory cores 12 arranged in the pattern consisting of vertical columns 14 and horizontal rows 16. Typically, these cores are formed from ferrite which is a molded ceramic composed of iron oxide and other metallic oxide powders. While cores are available in a wide variety of sizes and shapes the most common shape is the conventional toroid and in micro-miniature sizes these cores may be on the order of 0.05 inch in diameter or less. In any event, the matrix consists of a plurality of cores arranged in a plane with associated input and output leads threaded through the cores in a logical fashion.

The wiring for the matrix includes horizontal X leads 18 which pass through all of the cores 12 in each horizontal row 16 and Y leads 20 which pass through all of the cores in each vertical column 14. The leads 18 and 20 are connected to X drivers 22 and Y drivers 24 indicated generally in box form. X and Y receivers 26 and 28 respectively are also connected to the X and Y leads 18 and 20 and indicated generally in box form.

It will be noted in FIG. 1 that the X inputs are fed from one side only of the matrix and that the Y inputs are fed from another single side of the matrix. This is in contrast to a conventional matrix wherein the inputs are alternated from one side to the other from row to row and column to column.

In the practice of this invention, all of the cores 12 are arranged parallel to one another whereby their center axes are parallel and co-planar. In this fashion, the cores may be packed much more densely than by any other arrangement. Heretofore the positions of the cores alternated so that adjacent cores were generally right angular to one another. Such a pattern involves a substantial amount of waste space which has been eliminated by arranging the cores in the parallel manner illustrated. The cores may be brought up butt against one another without any effect on their operation so that a completed matrix is very dense and with an absolute minimum amount of interstitial space between the cores.

It will be appreciated that in FIG. 1 the cores and the windings are relatively widely separated in order to show details of construction and that in actual practice the cores and the windings will be assembled in much closer relationship as suggested in FIG. 2.

As is well known in the art, the X and Y drivers 22 and 24 provide half-pulses into the core matrix through X and Y leads 18 and 20 respectively in order to change the magnetic state of a selected one of the cores within the matrix. A particular core which will be at the intersection of an X and Y lead to which half pulses are applied will thus receive a full pulse of current sufficient to switch the core from one magnetic state to another and this state will be retained by the core. In order to obtain an output from the matrix, a third or S wire 30, sometimes referred to as the sense or read line, is threaded through all of the cores. The wire is passed diagonally back and forth through the matrix so that it extends through the axes of the cores as best shown in FIG. 1. As is well known in the art, an output voltage will occur on the sense line whenever a core within the matrix changes its state. When information is desired from the memory plane, the particular core is questioned with pulses and the output is read on the sense line.

Threaded also through the matrix is an inhibit or Z line 32. As is well known, the inhibit line is employed to provide a counter pulse selectively to the core matrix to prevent the cores from changing state when desired. When an inhibit driver is selected, it applies a half current pulse through all cores on the frame it serves. This pulse occurs at the same time as the X and Y pulses but it is in the opposite direction and it cancels out the selection of X and Y. With the inhibit pulse present, it is impossible to switch any core in the entire matrix.

In order for the inhibit or Z line to operate properly, it must pass through the cores in the matrix in the same direction so that a pulse of current will have the same effect on all the cores. Heretofore, the inhibit line has been threaded through the matrix in a rather complicated fashion involving an intersecting diagonal pattern which was quite difficult to thread and included an objectionable amount of waste electrical leads. According to the present invention, the Z or inhibit line 32 is threaded through either a vertical column or horizontal row of cores in each plane from one end or one side of the matrix and then brought back and passed through the next row or column until the matrix is entirely threaded. A return section 34 of the inhibit line 32 is shown in dotted line in FIG. 1 and extends from the bottom of one column of cores to the top of the next adjacent column. Rather than being only a connecting length of lead, the section 34 is employed as the inhibit line for a row or column of cores in an underlying matrix shown best in FIGS. 3 and 4. In the practice of this invention, a memory system may be made up in a single mat comprising four matrices, for example, indicated at 10, 40, 42 and 44 and connected by common Y lines 20 to be joined in end to end fashion. This permits the several matrices to be folded over in the manner suggested in FIG. 3 so that matrix 10 overlays matrix 40 and matrix 42 overlays matrix 44. The common inhibit line 32 is employed to sew together the matrices 10 and 40 and also to sew together the matrices 42 and 44. In FIG. 3 the inhibit line 32, including its return section 34, is shown in full line while the Y lines are shown in broken line for the sake of clarity.

As shown, the inhibit line originates at the lowermost matrix 44 and is threaded through the left-hand row of cores and then up and back through the left-hand column of cores in the next matrix 42 and then back into the adjacent row of the matrix 44 until the two matrices are sewn completely together. The inhibit line is then threaded up to the matrix 40 where it is sewn through the left-hand column of cores and then up through the left-hand column of cores in the top matrix 10. It is then returned to the matrix 40 and the sewing is continued until the matrices 10 and 40 are sewn together in the same fashion as the matrices 42 and 44. In FIG. 4 there is shown a cross-sectional view showing how the inhibit line sews together the two matrices. When the several matrices have been sewn together, they may be folded over in the manner suggested in FIG. 3 to produce a very compact and highly dense memory system.

In a typical embodiment, each matrix may consist of 99 Y driver lines and 76 X driving lines for a total of 304 X driving lines for the core mat assembly illustrated.

This winding arrangement reduces the matrix area by from 25 to 40 percent and the core density is more dependent upon wire size than upon core size since the parallel arrangement of the cores makes possible the assembly of cores in a more tightly packed fashion than by any other arrangement. Furthermore, the sense winding is less complex than previous methods and produces shorter lead lengths. Also the electrical connections to the external circuitry involve less complex wiring schemes than any other method and the core arrangement is such that accidental omission of one or more cores is substantially eliminated. For example, a memory system containing 30,096 cores was assembled with no wiring errors. This is in contrast to results obtained by conventional techniques where a memory system having the same number of cores would normally collect perhaps 100 wiring errors which would need correction for the unit to operate properly. In the above-described example, four core mats assembled in the manner described above and each mat containing 7,528 cores displaced an area of less than 2.5 inches by 3.75 inches per mat which represents a substantial size reduction over a conventionally assembled memory system.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States is:

1. A coincident current magnetic core memory system having X, Y, sense and inhibit lines, comprising (a) a plurality of magnetic cores, (b) said cores being arranged in co-planar rows and columns defining a matrix, (c) the axes of said cores being substantially parallel and disposed within the plane of said matrix, (d) said X lines passing through all cores in each of said rows, (e) said Y lines passing through all cores in each of said columns, (f) said sense line passing diagonally back and forth continuously through said matrix and axially through all of said cores, and (g) said inhibit line passing through all of said cores in one direction only.

2. A coincident current magnetic core memory system, comprising (a) a plurality of articulated memory planes, (b) each of said planes including a plurality of magnetic cores, (c) said cores being arranged in co-planar rows and columns defining a matrix, (d) the axes of said cores being substantially parallel and disposed in the plane of said matrix, (e) one set of input leads passing through all cores in each of said rows, (f) another set of input leads passing through all cores in each of said columns, and (g) sense and inhibit leads passing through all of said cores, (h) said inhibit leads extending in one direction through the cores in one plane and in an opposite parallel direction through the cores in an adjacent plane.

3. A coincident current magnetic core memory system, comprising (a) at least a pair of superimposed memory planes, (b) each of said planes including a plurality of magnetic cores, (c) said cores being arranged in co-planar rows and columns defining a matrix, (d) input leads passing through the cores of said planes for changing the magnetic state of selected ones of said cores, and (e) an inhibit lead for preventing a change in magnetic state of said cores, said inhibit lead passing alternately in one direction through a row of cores in one plane and then in an opposite direction through a row of cores in an adjacent plane whereby said planes are united in superimposed relation.

References Cited

UNITED STATES PATENTS

| | | | |
|---|---|---|---|
| 2,691,156 | 10/1954 | Saltz et al. | 340—174 |
| 3,161,860 | 12/1964 | Grooteboer | 340—174 |

STANLEY M. URYNOWICZ, Jr., *Primary Examiner.*

P. SPERBER, *Assistant Examiner.*